United States Patent [19]

Marrison

[11] 4,307,744
[45] Dec. 29, 1981

[54] FRANGIBLE INTERTANK VALVE ASSEMBLY

[75] Inventor: William C. Marrison, Jackson, Mich.

[73] Assignee: Aeroquip Corporation, Jackson, Mich.

[21] Appl. No.: 102,826

[22] Filed: Dec. 12, 1979

[51] Int. Cl.³ .............................................. F16K 13/04
[52] U.S. Cl. ................................. 137/68 R; 137/572;
220/85 S; 285/2; 244/135 R
[58] Field of Search .......................... 137/68, 71, 572;
220/85 S; 285/2; 244/135 R

[56]  References Cited

U.S. PATENT DOCUMENTS

| 2,048,388 | 7/1936 | Johnsen | 137/68 R |
| 2,393,679 | 1/1946 | Gunderson | 137/68 R |
| 3,273,578 | 9/1966 | Clark | 137/68 R |
| 3,319,642 | 5/1967 | Fox | 137/68 R |
| 3,719,194 | 3/1973 | Anderson | 137/614.03 X |
| 3,741,521 | 6/1973 | Tatsuno | 137/68 R X |
| 3,797,510 | 3/1974 | Torres | 137/68 R |

Primary Examiner—Harold W. Weakley
Attorney, Agent, or Firm—Beaman & Beaman

[57]  ABSTRACT

The invention pertains to a conduit assembly consisting of a flexible hose having a self sealing valved fitting at each end, such assembly being suitable for interconnecting aircraft fuel cells. The assembly is crashworthy in that upon displacement of the fittings relative to each other the resultant tension force produced in the hose causes the valves within the fittings to automatically close prior to the rupture of the hose thereby minimizing the likelihood of fuel spillage and fire. Frangible elements within the fittings fracturable upon predetermined hose tension forces existing insure the desired sequence of valve operation without requiring complicated apparatus, cables or links which would interfere with the flexibility of installation.

3 Claims, 5 Drawing Figures

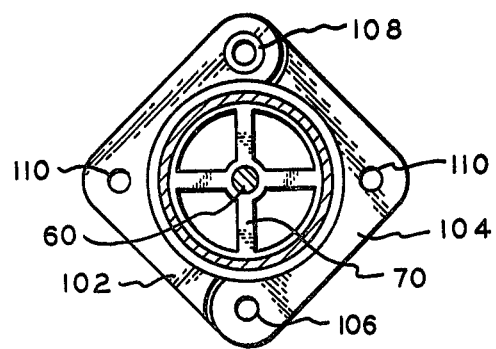
FIG_3.
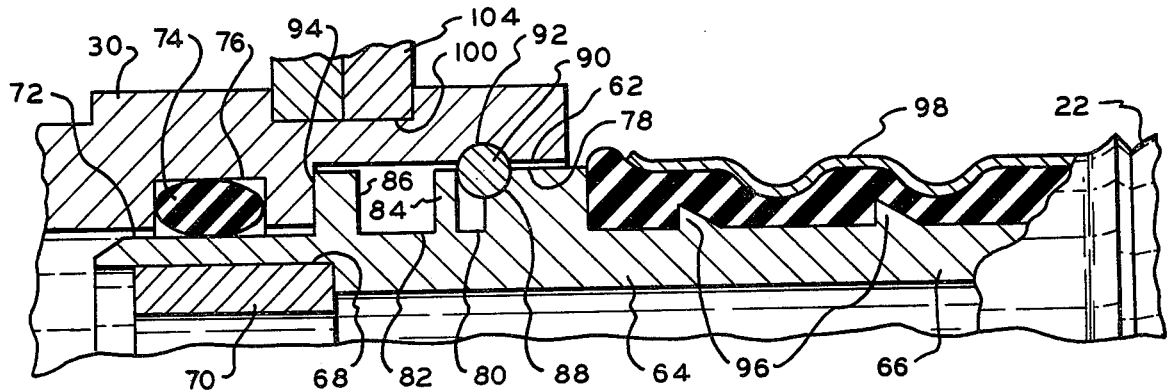
FIG_4.
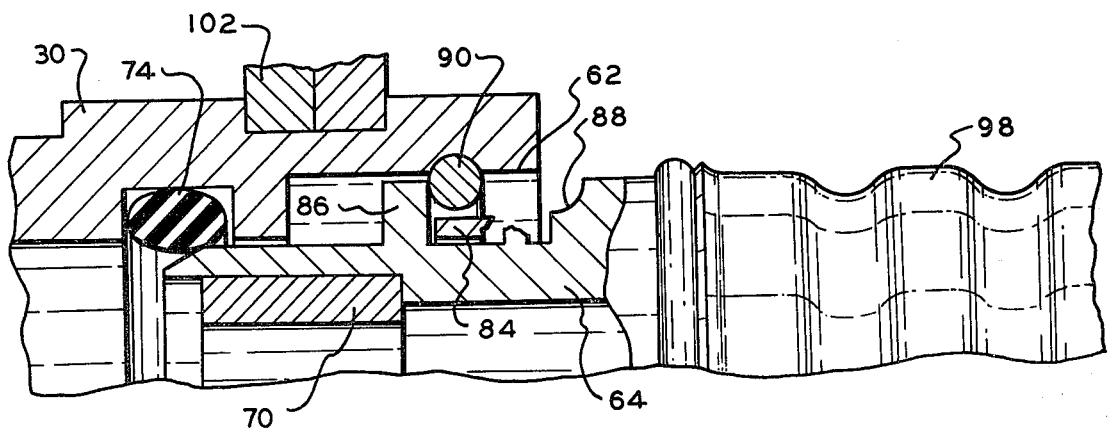
FIG_5.

FRANGIBLE INTERTANK VALVE ASSEMBLY

BACKGROUND OF THE INVENTION

To control and minimize fire during aircraft accidents it is common practice to employ crashworthy conduits and fittings with fuel systems. Such crashworthy devicds usually include self sealing valves and fittings having frangible components, and examples of such fittings and couplings are shown in U.S. Pat. Nos. 3,542,047; 3,719,194; 3,797,510; 3,913,603, and 4,119,111. Crashworthy couplings and fittings commonly utilize predetermined tension forces to trigger the sealing of the coupling or fitting upon impact.

Aircraft using adjacent fuel cells normally employ conduit systems interconnecting the fuel cells which are of a crashworthy construction. A common installation consists of two sets of self sealing valved couplings associated with a hose interconnecting the fuel cells with a frangible link existing at each fuel tank. Such an installation while permitting a degree of flexibility and misalignment between adjacent fuel cells, requires considerable space and separation between the fuel cells, and is expensive in that four self sealing valves are utilized.

Aircraft fuel cells have also been interconnected with rigid frangible self sealing valved fittings, but the rigidity of such systems is undesirable in that the cells must be closely and accurately positioned, and there is no flexibility to such a system to compensate for misalignment which often occurs during aircraft construction and fuel tank installation.

In crashworthy conduit systems interconnecting fuel cells tension members, such as cables, sheaths, or links are sometimes used to close the valves of the couplings as the fuel cells are displaced relative to each other during impact, and the use of such extraneous apparatus adds expense to the apparatus, and often complicates installation.

It is an object of the invention to provide a flexible hose and valved fitting assembly which can be used with aircraft fuel cells, or any installation, wherein it is desired to seal valves upon a predetermined tension existing within a flexible hose interconnecting the valved fittings.

A further object of the invention is to provide an intertank valve assembly utilizing identical fittings employing self sealing valves wherein the fittings are interconnected by a flexible hose to simplify assembly and installation by compensating for misalignment problems, and wherein a relatively short hose may be employed in a relatively concise space, and yet, the sequence of operation assures the closing of the fitting valves prior to hose rupture.

An additional object is to provide a flexible hose and self sealing valved fitting assembly utilizing frangible elements wherein a predetermined tension within the hose less than the hose rupture tension force will fracture the frangible elements releasing the fitting valves to a closed condition, and operation of the valves triggering apparatus is assured prior to hose rupture.

A further object of the invention is to provide a crashworthy flexible hose and self sealing valved fitting assembly wherein actuation is produced upon a predetermined tension existing within the hose, and wherein no tension devices other than the hose itself interconnects the spaced fittings.

In the practice of the invention a self sealing valved fitting is loated upon each end of a short flexible hose. Each fitting is adapted to be mounted in the wall of a fuel cell, and a mounting flange is associated with the fittings for this purpose. Ports are defined in the fitting, and a spring biased valve within the fitting is normally held in the full open position by a trigger mechanism.

Each fitting includes a nipple having a portion received within the hose, and the nipple is mounted within the fitting in such a manner that, upon the fracture of a frangible element, limited displacement between the nipple and fitting occurs in the direction of tension forces existing within the hose. A radially extending frangible rib is defined up on the nipple and the rib is in axial alignment with an abutment formed in the fitting engaging the rib. Upon a tension force existing within the hose which is less than the force which will rupture the hose the abutment will fracture the rib permitting sufficient nipple movement to actuate the associated valve trigger causing the spring biased valve to immediately close. The abutment prevents further relative movement between the nipple and fitting until the tension forces within the hose considerably exceed that necessary to fracture the ribs of both nipples whereby the valves within both fittings will close prior to rupture of the hose, or complete separation of a nipple and a fitting. Thus, the valves within the fittings will be closed prior to a condition existing wherein fuel may spill from the hose or fitting.

The nipple is provided with an axially extending cylindrical surface engaged by an O-ring carried by the fitting body wherein initial relative movement between the nipple and fitting to trigger the associated valve does not break a sealed relationship between the nipple and fitting, and the disclosed structure assures that the fitting valves will be closed prior to the interior of the assembly being exposed to the atmosphere.

BRIEF DESCRIPTION OF THE DRAWINGS

The aforementioned objects and advantages of the invention will be appreciated from the following description and accompanying drawings wherein:

FIG. 3 is an elevational, detail, sectional view taken along Section III—III of FIG. 2, FIG. 4 is an enlarged, detail, elevational, sectional view of the nipple and fitting structure illustrating the frangible rib intact, and FIG. 5 is a detail, enlarged, sectional view identical to FIG. 4 illustrating the relationship of the nipple and fitting after fracture of the frangible rib.

DESCRIPTION OF THE PREFERRED EMBODIMENT

Figure 1:
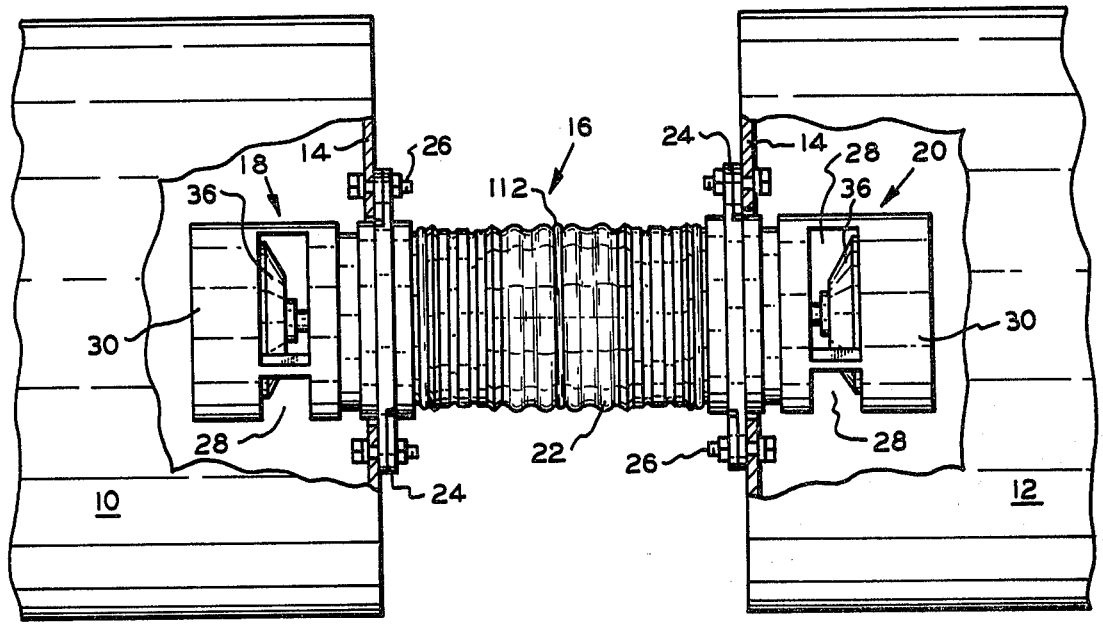
FIG. 1 is an elevational view illustrating a pair of spaced fuel cells with the hose and fitting assembly of the invention installed therebetween.

In FIG. 1 a typical installation is illustrated wherein fuel tanks or cells 10 and 12, such as may exist in aircraft, are mounted in spaced relationship, each cell including a vertically extending wall 14. The conduit assembly of the invention, generally indicated at 16, consists of identical fittings 18 and 20 mounted within openings in the walls 14 interconnected by a tubular flexible hose 22. Each fitting includes a mounting flange 24 having holes therein for receiving the mounting bolts 26, and each fitting, interiorly of the fuel tank, is provided with lateral ports 28 communicating with the interior of the hose wherein a free flow of fluid between the fuel cells 10 and 12 will take place in that the self sealing valves within the fittings are open under normal conditions.

Figure 2:
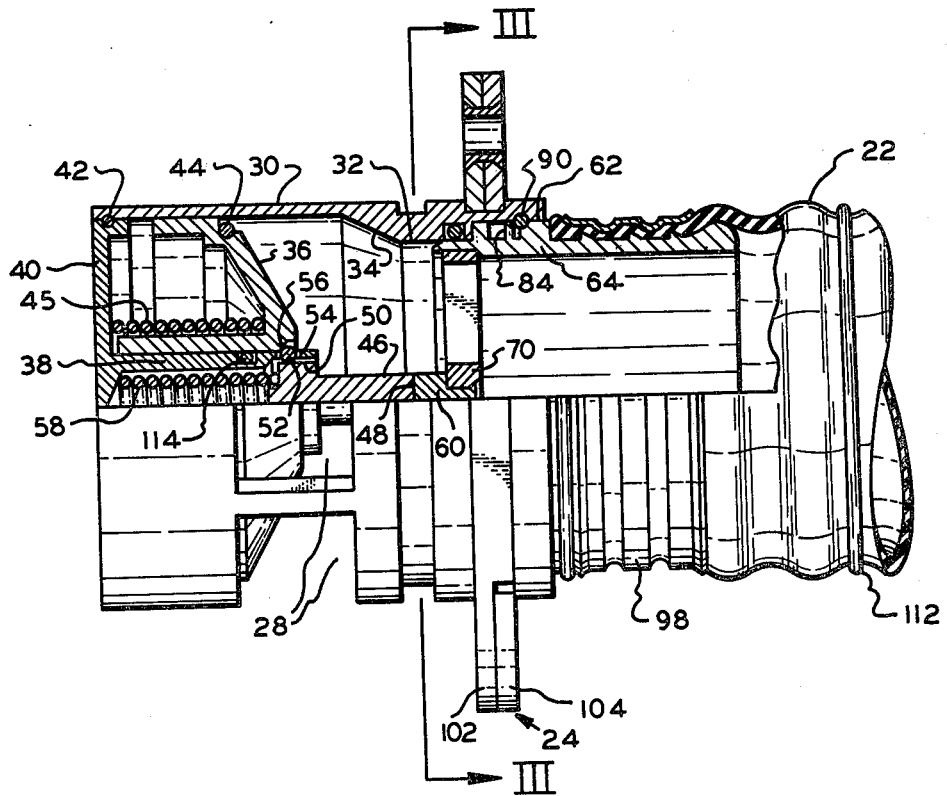
FIG. 2 is an enlarged, detail, sectional, diametrical view of a fitting in accord with the invention, the valve being shown in the open position.

The construction of the fittings 18 and 20 is identical, and is best appreciated from FIG. 2. Each fitting includes a tubular body 30 including a flow passage 32. The body is provided with the lateral ports 28 communicating with the passage, and the conical passage portion 34 comprises a valve seat.

Flow through the fitting is controlled by an axially movable valve 36 slidably mounted upon tubular guide 38, the guide constituting an axial portion of the cap 40 enclosing the inner end of the body 30 and maintained upon the body by a drive wire 42. A compression spring 45 interposed between the valve 36 and cap 40 biases the valve toward the valve seat 34, wherein engagement of the valve packing ring 44 with the valve seat will seal the passage 32 against fluid flow from the associated fuel tank.

Under normal conditions the valve 36 is maintained in its retracted open condition shown in FIG. 2 by an elongated trigger 46. The trigger includes an end 48 for engagement with a guide pin, as later described, and the trigger includes a cylindrical surface 50 which is normally radially aligned with a plurality of balls 52 mounted in openings 54 formed in the guide 38. The valve 36 includes an oblique abutment shoulder 56 which engages the balls, and the balls hold the valve in the open position illustrated against the biasing force exerted by the spring 45. A compression spring 58 biases the trigger 46 toward the right, but such movement is restrained by the guide pin 60.

As best illustrated in FIGS. 4 and 5, the fitting body 30 includes a cylindrical coaxial recess 62 receiving the tubular adapter 64 which constitutes a nipple having a portion 66 received within the hose 22. The adapter 64 includes a passage communicating with the passage of the body 30, and the inner end of the adapter is provided with a recess 68 which receives a spider 70 which supports the pin 60 centrally within the fitting passage, and the spider bears against the adapter recess shoulder wherein the pin 60 is capable of axially holding the trigger 46 against the axial force exerted by the spring 58 as shown in FIG. 2.

The adapter 64 includes an inner cylindrical surface 72 of significant axial dimension which is sealingly engaged by the annular packing ring 74 received within fitting groove 76. Additionally, the adapter includes a cylindrical portion 78 slidably received within the fitting recess 62, and the adapter is recessed at 80 and 82 to form the radially extending annular rib 84, and the radial rib 86. Also, the adapter is machined to provide a partially circular recess 88 for receiving the drive wire 90, also partially received within the fitting body semicircular cross section recess 92.

Accordingly, as appreciated from FIG. 4, the drive wire 90 will be received within the recesses 88 and 92, and engage the rib 84 to maintain the adapter within the fitting body recess 62, and the wire 90 and rib 84 prevents relative axial movement between the fitting and adapter, and maintains the adapter assembled to the fitting. The engagement of the rib 86 with the radial body shoulder 94 also serves to position the adapter relative to the body, and the normal assembled relationship between fitting body 30 and adapter 64 is as shown in FIG. 4.

The adapter nipple portion 66 is formed with annular ridges 96 to facilitate a sealed relationship to the hose 22 received thereon, and the metal swaged sleeve 98 encompassing the hose in radial opposition to the ridges 96 compresses the hose and assures a fluid tight connection between hose and adapter.

The fittings 18 and 12 are mounted upon their associated fuel cell wall 14 by the mounting flanges 24 defined on the fitting body. The mounting flange is received within annular recess 100, and preferably consists of a pair of plates 102 and 104 pivotally interconnected at 108, FIG. 3, and maintained in a closed condition by a bolt in hole 106. The holes 110 permit the mounting bolts 26 to mount the fittings within openings in the tank walls, and the usual gaskets will be employed to render the assembly fluid tight.

The hose 22 is preferably formed of an elastomeric material compatible with the chemical composition of the fuel or liquid within the tanks, and a reinforcing wire 112 may be employed about the central hose region.

The hose and fitting assembly 16 is mounted upon the tanks 10 and 12 in the manner apparent from FIG. 1, and the flexible nature of the hose 22 accommodates any slight misalignment that may exist between the axes of the respective fittings. Under normal conditions the valves 36 will be held in their full open position, as apparent in FIG. 2, and fuel passes between tanks 10 and 12 without restriction.

In the event of a crash or severe impact of the aircraft sufficient to displace the tanks relative to each other such to produce a tension within hose 22 a predetermined sequence of events occurs as described below:

The axial dimension of the frangible ribs 84 is predetermined wherein an axial force imposed upon the adapters 64 endeavoring to pull the adapters from the fitting body recesses 62 will cause the ribs 84 to fracture, as shown in FIG. 5, prior to the known and predetermined rupture value of the hose 22 being exceeded under tension or bending forces. Thus, initial hose tension forces less than those which will rupture the hose, will force the ribs 84 against their associated drive wires 90, and cause the ribs to shear or bend permitting the adapter 64 to axially shift within the body recess 62 as apparent in FIG. 5. Such axial movement of the adapter 64 relative to the body 30 moves the pin 60 away from its engaged trigger 46, permitting the trigger spring 58 to push the trigger out from the under the balls 52. As soon as the trigger surface 50 is no longer radially aligned with the balls to maintain the balls within their openings 54, the axial force imposed upon the valve 36 by the spring 45 will force the balls inwardly releasing the valve which is rapidly forced against the valve seat 36 sealing the fitting passage 32. Packing ring 114 mounted upon guide 38 seals the bore of the valve 36, and fluid is now prevented from escaping from the tank through the fitting.

The aforementioned fracturing of the ribs 84 occurs regardless of whether the tension forces imposed upon the adapter 64 are truly axial with respect to the adapter axis, or a bending force is imposed on the adapter by the hose. A sufficient bending force may fracture only a portion of the circumference of the rib 84, but sufficient axial deflection of the adapter relative to the body occurs to release the valve 36 and close the fitting to fluid flow.

The axial dimension of the adapter rib 86 is considerably greater than the axial dimension of frangible rib 84, and even though only one of the frangible ribs 84 initially fractures to permit closing of its associated valve, the engagement of the rib 86 with the drive wire 90 produces sufficient tension within the hose to assure that the other rib 84 will fracture to close its associated valve, thereby assuring that both fittings 18 and 20 will be closed to fluid flow prior to rupture of the hose.

When the ribs 86 of both fittings are engaging their associated drive wire 90 both fittings will have closed, and continued tension forces within the hose 22 will either cause a rib 86 to fracture completely pulling the adapter from its associated fitting body, or the hose may rupture. With respect to fuel leakage, regardless of which occurrence takes place, the only fuel that will be spilled will be that within the hose itself since the valves of both fittings have closed.

It will be appreciated that in the event of an aircraft crash the aforedescribed sequence of events usually happens in less than one second, and the spring biasing of the trigger 46 and valve 36 assures instantaneous response. The described structure and operation, by solely utilizing the hose as the interconnection between the adapters 64, simplifys the interconnection between the fittings without complicating assembly and installation, and as the ribs 84 fracture prior to hose rupture integrity of the assembly is maintained until the valves 36 are fully closed. In this respect, it is to be noted that the axial dimension of the adapter sealing surface 72 is sufficient to permit engagement between the surface 72 and packing ring 74 until the adapter has been displaced far enough to insure closing of the associated valve. Thus, in the event a partial displacement of the adapter should occur which is less than that necessary to permit the valve to close, the fluid tight assembly between the fitting body and adapter is not broken and leakage is prevented.

It is appreciated that various modifications to the inventive concepts may be apparent to those skilled in the art without departing from the spirit and scope of the invention.

I claim:

1. A crashworthy flexible hose and valved fittings assembly characterized by the fact that the hose constitutes the sole interconnection between the valved fittings comprising, in combination, a flexible hose having ends and a known resistance to rupture under tension forces, a self sealing valved fitting mounted upon each end of said hose each having an axis, each fitting including a tubular adapter received within a hose end selectively axially displaceable with respect to an associated fitting body between valve retaining and valve release positions, fitting mounting means defined on each fitting body, each fitting body including a flow passage defined therein communicating with said hose through the associated adapter and a normally open valve within said flow passage, valve retaining means mounted upon each fitting interposed between the associated fitting body and adapter normally retaining the associated valve in its open condition, frangible means interposed between said adapters and the associated fitting body maintaining said adapters in said valve retaining position, said frangible means fracturing upon the tension within said hose reaching a predetermined value permitting said adapters to move to said valve release position solely in response to the tension within said hose to release the associated valve to a closed condition prior to the tension within said hose exceeding said known resistance to rupture, sealing means interposed between each adapter and the associated fitting body establishing a sealing relationship therebetween at said adapter's valve retaining and valve release positions, and abutment means interposed between each adapter and the associated fitting body preventing separation of said adapters from the associated fitting body under hose tension forces until the tension within said hose is solely sufficient to fracture said frangible means of both fittings to permit both adapters to be displaced to said valve release positions to operate said valve retaining means to release and close the valves of both of said fitting bodies.

2. In a crashworthy flexible hose and valved fittings assembly as in claim 1, said frangible means comprising a radially extending rib defined on each adapter, and a drive wire abutment defined on each said fitting body in axial alignment with said rib and located intermediate said rib and said hose.

3. In a crashworthy flexible hose and valved fittings assembly as in claim 1, said sealing means comprising each said adapter including an axially extending cylindrical surface extending within the associated fitting body, a seal ring defined upon the associated fitting body sealing engaging said cylindrical surface, said surface being of sufficient length to maintain a sealed engagement with said seal ring during movement of said adapter between said valve retaining and valve release positions to release said valve retaining means.

* * * * *